3,772,418
MOLDING PROCESS FOR IMIDAZOPYRROLONE POLYMERS
Charles L. Johnson, Houston, Tex., assignor to the United States of America as represented by the Administrator of the National Aeronautics and Space Administration
No Drawing. Filed Oct. 29, 1971, Ser. No. 193,980
Int. Cl. B29f 5/02; C08g 20/20
U.S. Cl. 264—294                                              3 Claims

ABSTRACT OF THE DISCLOSURE

A process for producing shaped articles of imidazopyrrolone polymers comprising molding imidazopyrrolone polymer molding powder under pressure and at a temperature greater than 475° C. Moderate pressures may be employed. Preferably, prior to molding, a preform is prepared by isostatic compression. The preform may be molded at a relatively low initial pressure and temperature; as the temperature is increased to a value greater than 475° C., the pressure is also increased.

ORIGIN OF THE INVENTION

The invention described herein was made by an employee of the United States Government and may be manufactured and used by or for the Government for governmental purposes without the payment of any royalties thereon or therefor.

FIELD OF INVENTION

The present invention relates to a process for molding polymers. More specifically, the present invention relates to a process for producing tough, compact, rigid, high temperature stable, flame resistant, and readily machinable shaped articles of imidazopyrrolone polymers.

BACKGROUND OF INVENTION

Various polymers, particularly linear polyamides, polyesters, etc., have found wide application in the plastics industry in the form of films, fibers and molded articles. There has developed an ever increasing need in certain industries, such as the aerospace industry, for polymeric materials which exhibit particular specific properties. These properties include a high order of stability at elevated temperatures, flame resistance, stability to ionizing radiation, strength, toughness, hardness, and machinability. Imidazopyrrolone polymers exhibiting a "ladder" structure have been found to exhibit such physical and chemical properties.

Imidazopyrrolone polymers may be prepared by reacting a mixture of an aromatic dianhydride or aromatic tetracarboxylic acid with an aromatic tetraamine having two pairs of ortho-diamines. One method of preparing polyimidazopyrrolones involves dissolving an aromatic dianhydride in a highly polar solvent, such as dimethyacetamide, dimethyl sulfoxide, dimethyl formamide or the like, and mixing with an aromatic tetraamine dissolved in a like or similar solvent. The resulting mixture may be readily converted to an amide-acid-amine intermediate structure, which can then be cyclized to a fused "ladder" or partial "ladder" structure.

The preparation of potentially complete imidazopyrrolone "ladder" polymers may be illustrated by the reaction between pyromellitic dianhydride (PMDA) and 1,2,4,5-tetraamine benzene (TAB) in accordance with the following reaction:

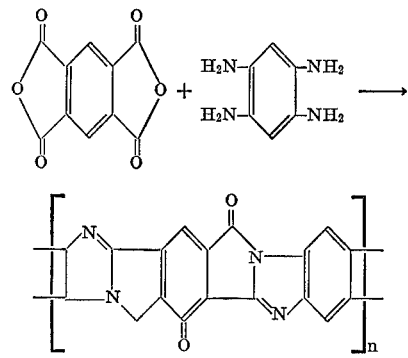

Numerous imidazopyrrolone polymers and methods of preparing them are disclosed in U.S. Pats. Nos. 3,518,232 and 3,414,543 and in Polymer Letters, Vol. 3, pp. 977–984 (1965).

PRIOR ART

Prior art techniques of preparing shaped articles of imidazopyrrolone polymers involve casting, extruding, or molding dry powder of a poly (amide-acid-amine) prepolymer. The shaped article is then heated to a temperature adequate to complete cyclization, whereby the imidazopyrrolone ladder structure is obtained. Such techniques are disclosed in U.S. Pats. Nos. 3,518,232 and 3,414,543. In accordance with prior art techniques, cyclization is achieved by heating to a temperature of less than 400° C. It was generally thought that gradual degradation of the polymer would occur at temperatures above 450° C. and that molding process using temperatures higher than 450° C. would yield only badly charred and weakened material.

It has now been found, surprisingly, that tough, compact, rigid, high temperature stable, flame resistant and readily machinable molded structures may be obtained by molding cured (cyclized) imidazopyrrolone molding powders. Molded articles may be obtained, very rapidly at moderate pressures, if molding temperatures between about 450° C. and 600° C. are employed.

SUMMARY OF INVENTION

Shaped articles of imidazopyrrolone polymers may be prepared by molding, under pressure, cured polyimidazopyrrolone molding powder, at a temperature greater than 475° C. Conventional molding techniques and moderate pressure, i.e., as low as 500 p.s.i., may be employed.

Preferably, prior to molding a preform of cured polyimidazopyrrolone molding powder is prepared by isostatic compression.

DETAILED DESCRIPTION OF INVENTION

The process of the present invention is useful for preparing shaped articles of any imidazopyrrolone polymer. In contrast to previous process for preparing shaped articles of polyimidazopyrrolone polymers, which utilized an amide-acid-amine prepolymer, the process of the present invention employs cured polyimidazopyrrolone molding powder. The use of a cured polymer and a high temperature makes it possible to obtain strong and coherent shaped articles rapidly (in a matter of minutes) of a moderate pressures. The prior art techniques, employing uncured molding powder, require lengthy (often a matter of hours) and complicated molding procedures.

The expression "cured polyimidazopyrrolone," as used herein, refers to imidazopyrrolone polymers which have been partially and substantially completely cyclized to a fused "ladder" structure.

The molding process of the present invention is conducted at a temperature of at least 475° C. The temperature should not exceed a value at which the imidazopyrrolone polymer will be substantially degraded. Temperatures up to about 600° C. may be conveniently employed.

Preferably, cured cyclized polyimidazopyrrolone powder is isostaticly compressed to yield a dense compact preform prior to the final molding operation. The preform is easy to handle and assures even distribution of the powder particles in the molded cavity. Techniques of preparing articles of polymer molding powders by isostatic compression, and the advantages thereof, are well known in the prior art. See for example JPL Space Programs Summary, No. 37-38, vol. IV, pp. 86–90. While suitable preforms can be prepared at moderate pressures, preferably isostatic pressure in excess of 10,000 p.s.i. is employed.

If the molded cavity can be filled evenly with the polymer particles, the preparation of a preform is not necessary. The preform, or molding powder, can be molded to the desired shape by either conventional compression molding or by isostatic molding at pressures as low as 500 p.s.i. and temperatures within the range of 475° C. to 600° C. There is no upper limit with respect to the pressure which may be employed to produce the shaped articles. While not necessary, pressure as high as 100,000 p.s.i. or higher may be employed if desired.

The preform or polymer molding powder may be heated to a temperature of at least 475° C., under pressure, using conventional molded heaters or by employing such heating methods as dielectric radio frequency or microwave.

A preform or molding powder may be placed in a molded cavity and subjected to any convenient initial pressure and to an initial temperature of less than 475° C. The temperature of the mold may then be raised to a value greater than 475° C. As the temperature of the mold is raised, preferably the pressure is also raised, particularly if an initial pressure of less than 500 p.s.i. is employed. The polyimidazopyrrolone should not be heated to temperatures approaching 475° C., unless it is under pressure.

It is speculated that the use of high temperatures (475° C. to 600° C.) in the preparation of shaped articles of polyimidazopyrrolone polymers results in a chemical reaction whereby the polymer powder particles are completely fused together. This complete fusion in the molding results in molded articles having strength and heat resistance consistent with the chemical structure of imidazopyrrolone. It is believed that conventional moldings, or powders of imidazopyrrolone polymers, are not fully cyclized. The high molding temperatures employed in the process of the present invention results in advancing the imidazopyrrolone polymer of the shaped article to a more completely cyclized polymer. The more completely cyclized polymer has a more aromatic, semi-graphitic and thermally stable state, than the incompletely cyclized polymer of the molding powder. The high temperatures employed also probably result in the expulsion of final traces of volatiles with the result that there is a transitory plasticization of the powder mass.

The process of the present invention can be used to make filled (composite) moldings with a wide range of physical, chemical and electrical properties. For example, fillers such as pigments, glass fibers, electrically conductive carbon black, metal particles, abrasives, dielectrics, etc. can be blended with the molding powder.

Shaped articles produced by the process of the present invention can be used in a variety of applications particularly when strength, heat stability, radiation resistance, toughness, hardness, thermal resistance, flame resistance and insolubility are of importance. Articles prepared in accordance with the process of the present invention are particularly useful as components for aircraft, spacecraft, nuclear engines, rocket engines, generators, etc.

What is claimed is:
1. A process for producing shaped articles of imidazopyrrolone polymers comprising:
   (a) providing a partially or incompletely cyclized imidazopyrrolone polymer molding powder in a pressure mold,
   (b) applying and maintaining a pressure of at least 500 p.s.i. on the mold while
   (c) simultaneously increasing the mold temperature to the range of about 475° C. to about 600° C., whereby a tough, compact, rigid, high temperature stable, flame resistant, and readily machinable completely cyclized molded structure is obtained.
2. A process for producing shaped articles with imidazopyrrolone polymer powders comprising:
   (a) providing a partially or incompletely cyclized imidazopyrrolone powder,
   (b) forming a preform of the imidazopyrrolone molding powder by isostatic compression,
   (c) molding said preform in a pressure mold at
      (i) a pressure of at least 500 p.s.i., while
      (ii) simultaneously heating the mold to a temperature of about 475° C. to 600° C., whereby a tough, compact, rigid, high temperature stable, flame resistant, and readily machinable completely cyclized molded structure is obtained.
3. A process for producing shaped articles of imidazopyrrolone polymers comprising:
   (a) providing a quantity of a partially or incompletely cyclized imidazopyrrolone polymer powder,
   (b) molding the imidazopyrrolone powder under pressure in a pressure mold and at a temperature of less than 475° C., and
   (c) increasing the pressure and raising the temperature to a value greater than about 475° C., but less than about 600° C., said pressure, after the temperature has been raised to a value greater than 475° C., being at least 500 p.s.i., whereby a tough, compact, rigid, high temperature stable, flame resistant, and readily machinable completely cyclized molded structure is obtained.

References Cited
UNITED STATES PATENTS

| | | | |
|---|---|---|---|
| 3,657,190 | 4/1972 | Hughes et al. | 260—47 CP |
| 3,497,578 | 2/1970 | Glass et al. | 264—89 |
| 3,523,148 | 8/1970 | Boyer et al. | 264—88 |
| 3,573,260 | 3/1971 | Morello | 264—331 |
| 3,414,543 | 12/1968 | Paufler | 260—47 CP |
| 3,518,232 | 6/1970 | Bell | 260—47 CP |
| 3,662,052 | 5/1972 | Nowak et al. | 264—331 |
| 3,549,594 | 12/1970 | Twilley et al. | 260—47 CP |

ROBERT F. WHITE, Primary Examiner

J. R. THURLOW, Assistant Examiner

U.S. Cl. X.R.

260—78 TF; 264—119, 88, 320, 331